United States Patent [19]

Pitzer et al.

[11] Patent Number: 5,030,434

[45] Date of Patent: Jul. 9, 1991

[54] SILICON NITRIDE POWDERS WITH IMPROVED SURFACE PROPERTIES AND PROCESSES FOR THEIR PREPARATION

[75] Inventors: Ulrike Pitzer; Gerhard Franz; Benno Laubach, all of Krefeld, Fed. Rep. of Germany

[73] Assignee: Bayer Aktiengesellschaft, Leverkusen, Fed. Rep. of Germany

[21] Appl. No.: 579,237

[22] Filed: Sep. 4, 1990

Related U.S. Application Data

[63] Continuation of Ser. No. 396,281, Aug. 21, 1989, abandoned.

[30] Foreign Application Priority Data

Aug. 31, 1988 [DE] Fed. Rep. of Germany ....... 3829504

[51] Int. Cl.$^5$ .................... C01B 21/068; C01B 21/00
[52] U.S. Cl. ........................................ 423/344; 501/97
[58] Field of Search ............................ 423/344; 501/97

[56] References Cited

U.S. PATENT DOCUMENTS 4,284,432 8/1981 Nishida et al. ...................... 423/344
4,341,874 7/1982 Nishida et al. ...................... 501/97

FOREIGN PATENT DOCUMENTS 0251322 1/1988 European Pat. Off. .

OTHER PUBLICATIONS

Oxygen Distribution in Silicon Nitride Powders, Chapman and Hall Ltd., London, 1987, pp. 3717–3720.
Zusammenfassung Nr. 107-117860z, Columbus, Ohio, 1987, Chemical Abstracts.
High-Temperature Behavior of Chemically Treated Silicon Nitride Powders, 1988, pp. C-183-C-184.
Controlling the Oxygen Content of $Si_3N_4$ Powders, Columbus, Ohio, 1980, pp. 1155–1156.
Probleme der Feinstpulverherstellung fur Mechanokeramik durch Mechanische Aufbereitung, Freiburg, 1988, p. 92, in German only, no translation.
Imamura et al., Eng. Sci. Proc. 7; 828-838 (1986).

*Primary Examiner*—Olik Chaudhuri
*Assistant Examiner*—Kenneth Horton
*Attorney, Agent, or Firm*—Connolly & Hutz

[57] ABSTRACT

$Si_3N_4$ powders having a total oxygen content of less than 1.8% by weight with the proportion of surface oxygen content of more than 65% of the total oxygen content, and having a fluorine content of less than 35 ppm are prepared by annealing $Si_3N_4$ powders having a total oxygen content of less than or equal to 0.4% by weight in an oxygen-containing atmosphere at temperatures of 700° C. to 1200° C. for 15 to 90 minutes or by grinding $Si_3N_4$ powders having a total oxygen content of less than or equal to 0.4% by weight in water, alcohol or aqueous alcohol 15 to 120 minutes.

4 Claims, 2 Drawing Sheets

SILICON NITRIDE POWDERS WITH IMPROVED SURFACE PROPERTIES AND PROCESSES FOR THEIR PREPARATION

This application is a continuation of application Ser. No. 396,281, filed 08/21/89, now abandoned.

This invention relates to $Si_3N_4$ powders having a total oxygen content of less than 1.8% by weight, the surface oxygen content amounting to more than 65% of the total oxygen content, and to processes for the preparation of these powders.

BACKGROUND OF THE INVENTION

Silicon nitride powders all have a certain oxygen content. Depending on the field of application, the oxygen content is about 0.8 to 2.5% by weight. Although the oxygen is strictly speaking an impurity of the powder, it is regarded as necessary to a certain extend for improving the sintering activity of the silicon nitride powder (G. Ziegler, J. Heinrich, G. Wötting, J. Mater. Sci. 22 (1987), 3041-86).

Sintering additives are conventionally added to the silicon nitride powder and together with the oxygen in the powder they form liquid phases at the sintering temperature and are essential for bringing about a compacting of the material. The oxygen content in the silicon nitride powder should, however, not be too high since a high oxygen content lowers the glass temperature of the secondary phases formed in the sintering process and therefore impairs the mechanical properties at high temperatures of the sintered product obtained. An oxygen content of about 1.5% by weight is generally regarded as optimal for gas pressure sintering but for hot isostatic pressing the oxygen content may be lower. No limiting values are known for the oxygen required for hot isostatic pressing.

Determination of the oxygen distribution in commercial $Si_3N_4$ powders by ESCA (Electron Spectroscopy for Chemical Analysis) is described in J. Mater. Sci. 22 (1987), 3717-3720. It is stated there that the oxygen content should be reduced in the interior of the particles. For a required total oxygen content of 1.5% by weight, this means an enrichment of oxygen on the surface of the particles. According to the said literature reference, the distribution of oxygen between the interior of the particles and the surface of the particles depends to a large extent on the method of preparation employed. $Si_3N_4$ powders prepared by the nitridation of silicon or by reductive nitridation of $SiO_2$ show only a slight enrichment of oxygen on the surface of the powder. The Proportion of surface oxygen is from 17% to 58% of the total oxygen content. In powder prepared by the gas phase reaction of $SiCl_4$ and $NH_3$ at room temperature (Toyo Soda TS 7), the surface oxygen content is 60%. In $Si_3N_4$ powder obtained by the liquid phase reaction between $SiCl_4$ and $NH_3$ followed by thermal decomposition of the diimide (Ube E 10), the enrichment of oxygen on the surface is even higher, amounting to 83%. This powder, however, has a total fluorine content, determined under wet chemical conditions, of over 35 ppm. In ESCA investigations, the fluorine content on the surface of the powder is about 0.3 Atom-%. Fluorine, however, reduces the high temperature strength of parts obtained by sintering the powder since fluorine influences the glass temperature of the secondary phases in the same way as oxygen (L. A. G. Hermansson, M. Burstroöm, T. Johansson, M. E. Hatcher, J. Amer. Ceram. Soc. 71 (4) (1988), C183-184).

Apart from the general methods for the preparation of powders, there are several methods for adjusting the oxygen content on the surface of the powders. Firstly, the powder may be partly oxidized in air by annealing at temperatures above 500° C. (see Greskovich, J. A. Palm, Am. Ceram. Soc. Bull. 59(11) (1980), 1133). The oxidation begins on the surface of the powder, thereby enabling the surface oxygen content to be increased. This, however, leads to an increase in the oxygen content to over 1.8% by weight and hence, as described above, to an impairment of the high temperature properties. The method of increasing the surface oxygen content by hydrolysis has the same disadvantage. When commercial $Si_3N_4$ powder having a low surface oxygen content is ground up in water or alcohol, a surface layer rich in oxygen is obtained by hydrolysis but at the same time the total oxygen content is increased to a value above 1.8% by weight.

If one starts with powders which have a high oxygen content on the surface, obtained, for example, by grinding in water, the total oxygen content may be reduced by leaching with HF. By optimization, it is possible to obtain a powder which has a high surface oxygen content and a total oxygen content of less than 1.8% by weight. This method has, however, the disadvantage that traces of fluoride ions are left in the powder and accumulate on the surface of the powder as a result of the procedure employed. These traces cannot be removed by washing.

It is an object of the present invention to provide $Si_3N_4$ powders which do not have the above-described disadvantages of the state of the art.

BRIEF DESCRIPTION OF THE INVENTION

It has now been found that it is possible to prepare silicon nitride powders in which the surface oxygen content is increased to a high value without the total oxygen content rising to a value above 1.8% by weight and without the undesirable presence of fluoride ions in the surface layer. These $Si_3N_4$ powders have a total oxygen content of less than 1.8% by weight and the proportion of surface oxygen content amounts to more than 65% of the total oxygen content while their fluorine content is less than 35 ppm. These $Si_3N_4$ powders are the subject of the present invention. Those $Si_3N_4$ powders according to the invention in which the fluorine content on the surface of the $Si_3N_4$ powder is less than 0.1 Atom-% are particularly preferred.

DETAILED DESCRIPTION OF THE INVENTION

Figure 1:
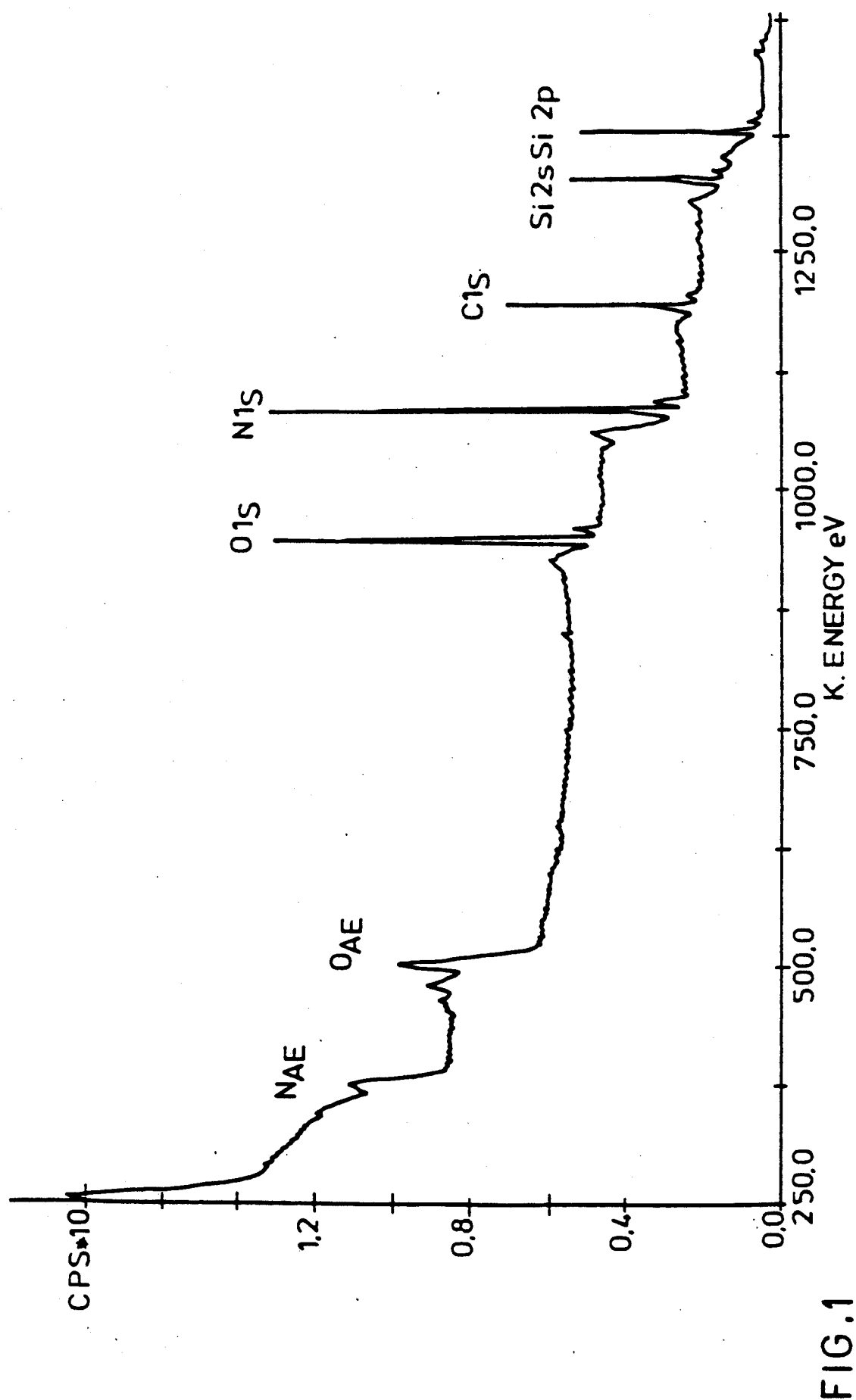

Such $Si_3N_4$ powders according to the invention may be obtained by starting from a powder which has an extremely low total oxygen content. Such powders and processes for their preparation are the subject matter of copending U.S. Ser. No. 396,328, filed Aug. 21, 1989. The $Si_3N_4$ starting powders used for this purpose should have an oxygen content of less than or equal to 0.4% by weight.

This invention also relates to a process for the preparation of the $Si_3N_4$ powders according to the invention. One possible method according to the invention is characterised in that $Si_3N_4$ powders having a total oxygen content of less than or equal to 0.4% by weight are annealed at temperatures from 700° C. to 1200° C. for 15 minutes to 90 minutes in an oxygen-containing atmosphere. If the total oxygen content is higher than 0.4% by weight, control of the subsequent steps to ensure that the final oxygen content does not exceed 1.8% by weight can only be achieved with considerable technological effort, especially in the case of very finely divided and therefore reactive powders.

Since silicon nitride is thermodynamically unstable compared with silicon dioxide, it was to be expected that silicon nitride powders, and especially those with a low oxygen content, would be readily oxidized and hydrolysed until the reaction is slightly inhibited after some time by the formation of a passivating layer. It was surprisingly found, however, that powders having a total oxygen content of less than or equal to 0.4% by weight react very slowly in oxidation and hydrolysis reactions so that it is technically simple to increase the oxygen content of their surface to a specified level. If the times are too short or the temperatures too low in the process according to the invention, then there will not be enough accumulation of oxygen on the surface. If the times are too long or the temperatures too high, the oxygen content may rise to a value above 1.8% by weight. It is therefore necessary to optimize the time and temperature according to the oxygen content of the starting material if the desired $Si_3N_4$ powders are to be obtained in which the total oxygen content is less than 1.8% by weight and the proportion of surface oxygen amounts to more than 65% of the total oxygen content and at the same time the fluorine content is less than ppm and in particular the fluorine content on the surface of the powder is less than 0.1 Atom-%.

In another preferred embodiment, the powder according to the invention may be prepared from $Si_3N_4$ powder having an oxygen content of less than or equal to 0.4% by weight by grinding up such a powder in water and/or alcohol for 15 to 120 minutes. Alcohols useful are the lower alcohols soluble in water such as methanol, ethanol, n-propanol, isopropanol, butanol and glycols such as ethylene glycol or propylene glycol, $Si_3N_4$ powders are conventionally not ground up in water but in organic solvents because the oxygen content would otherwise rise to too high a value (B. Hoffmann, Keramische zeitschrift 40(2), (1988), 90–96). If, however, one starts with powders which have a very low oxygen content, the surface of the powder can be adjusted to a specified oxygen content by optimizing the grinding time without the total oxygen content rising to a value above 1.8% by weight.

The specific surface area BET of the powders according to the invention is determined by the nitrogen one-point adsorption method according to DIN 66131 = British Standard Inst. 4359, Part 1 (1969).

The total oxygen content of the $Si_3N_4$ powders is determined by inert gas fusion technique. A sample of $Si_3N_4$ is weighted into a graphite crucible and heated to a temperature above 1800° C. in a stream of helium. The oxygen contained in the sample is thus converted into CO which is determined quantitatively by means of an IR measuring cell.

To determine the total fluorine content, the samples of powder are decomposed in an alkaline melt. The fluoride formed is distilled off in a steam distillation apparatus and the fluoride content is determined quantitatively by means of an electrode which is sensitive to fluoride ions.

The fluorine content on the surface of the powder may be determined quantitatively by means of ESCA from the peak intensity of the F 1 s-peak divided by the atomic sensitivity factor for fluorine (Practical Surface Analysis by Anger and X-ray Photo-Electron-Spectroscopy; Ed. D. Briggs, M. P. Seak, Wiley and Sons, New York (1983)).

The ratio of surface oxygen to total oxygen is determined by means of ESCA by the method described by Peuckert and Greil (J. Mater. Sci. 22 (1987), 3717–3720). ESCA is used to measure the peak intensities of the O 1 s and N 1 s peaks ($I_N$ or $I_O$) corrected by the atomic sensitivity factors, divided by $I_N°$ or $I_O°$ (theoretical signal intensities which would be obtained for pure $SiO_2$ or $Si_3N_4$; $I_N°/I_O°$ was calculated to be 1.03), and the ESCA thickness of the oxide layer $d_{XPS}$ is determined from the result according to the following formula:

$$d_{XPS} = m \ln \left[ \frac{I_O \times I_N°}{I_O° \times I_N} + 1 \right],$$

where m is the average depth of exit (under the given conditions, m = 1.2 nm). An average particle diameter Ds can be calculated from the specific surface area BET (in m²/g) in accordance with the following formula:

$$D_s = \frac{6}{\rho_{Si3N4} \times BET} = \frac{1.887 \times 10^{-6}}{BET} (m).$$

An imaginary surface oxygen layer $d_s$ which would be obtained if the total oxygen were bound on the surface may be calculated from the average particle diameter Ds and the total oxygen content $C_O$ (% by weight) in accordance with the following equation:

$$d_s = [1 - (1 - 0.026 \times C_O)^{\frac{1}{3}}] \times \frac{D_s}{2}.$$

The percentage of surface oxygen based on the total proportion of oxygen may be determined from the percentage ratio of $d_{XPS}$ and $d_s$.

The $Si_3N_4$ powders according to the invention and methods for their preparation will be described in more detail below with the aid of Examples which should not, however, be regarded as limiting.

EXAMPLE 1

12.3 g of $Si_3N_4$ powder having a total oxygen content of 0.22% by weight obtained according to Example 2 of copending U.S. Ser. No. 396,328 filed Aug. 21, 1989 are annealed in air in a tubular furnace at 1000° C. for one hour. The weight increase is less than 0.1 g. The specific surface area BET of the annealed powder is 4.0 m²/g. The total oxygen content determined by the inert gas fusion technique is found to be 0.45% by weight. The fluorine content is less than 10 ppm. No fluorine can be detected on the surface of the powder by ESCA (limit of detection about 0.1 Atom-%).

FIG. 1 shows the ESCA spectrum of the annealed sample. The values given in Table 1 may be calculated from this graph by the method of Peuckert and Greil (J. Mater. Sci. 22 (1987), 3717–3720).

TABLE 1

| | | Calculation of the percentage proportion of surface oxygen | | | | |
|---|---|---|---|---|---|---|
| $I_O/I_N$ | $d_{XPS}$ [nm] | BET [m²/g] | $D_s$ [μm] | $C_O$ [% by wt.] | $d_s$ [nm] | $d_{XPS}/d_s$ [%] |
| 0.705 | 0.655 | 4.0 | 0.47 | 0.45 | 0.920 | 71 |

According to these figures, the percentage proportion of surface oxygen, based on the total oxygen content, is 71%.

EXAMPLE 2

An amorphous $SiCl_4$ preliminary product is prepared by the reaction of $SiCl_4$ with $NH_3$ in the gaseous phase followed by dechlorination. This preliminary product has a BET of 135 m²/g. 3 kg of this amorphous preliminary product are introduced into a crystallisation boat within a period of 60 minutes and then left to crystallise for 2 hours at a temperature of 1500° C. The moisture content of the atmosphere during handling is less than 5 ppm. The crystalline product has an oxygen content of 0.27% by weight.

700 g of this $Si_3N_4$ powder are ground up with steel balls in 900 ml of water for 70 minutes. The iron abrasion is removed and the powder is dried and the powder is dried. The specific surface area BET of the ground powder is 13.3 m²/g. The total oxygen content is found to be 1.2% by weight. The total fluorine content is less than 10 ppm. No fluorine can be detected on the surface of the powder by ESCA (limit of detection about 0.1 Atom-%.

Figure 2:
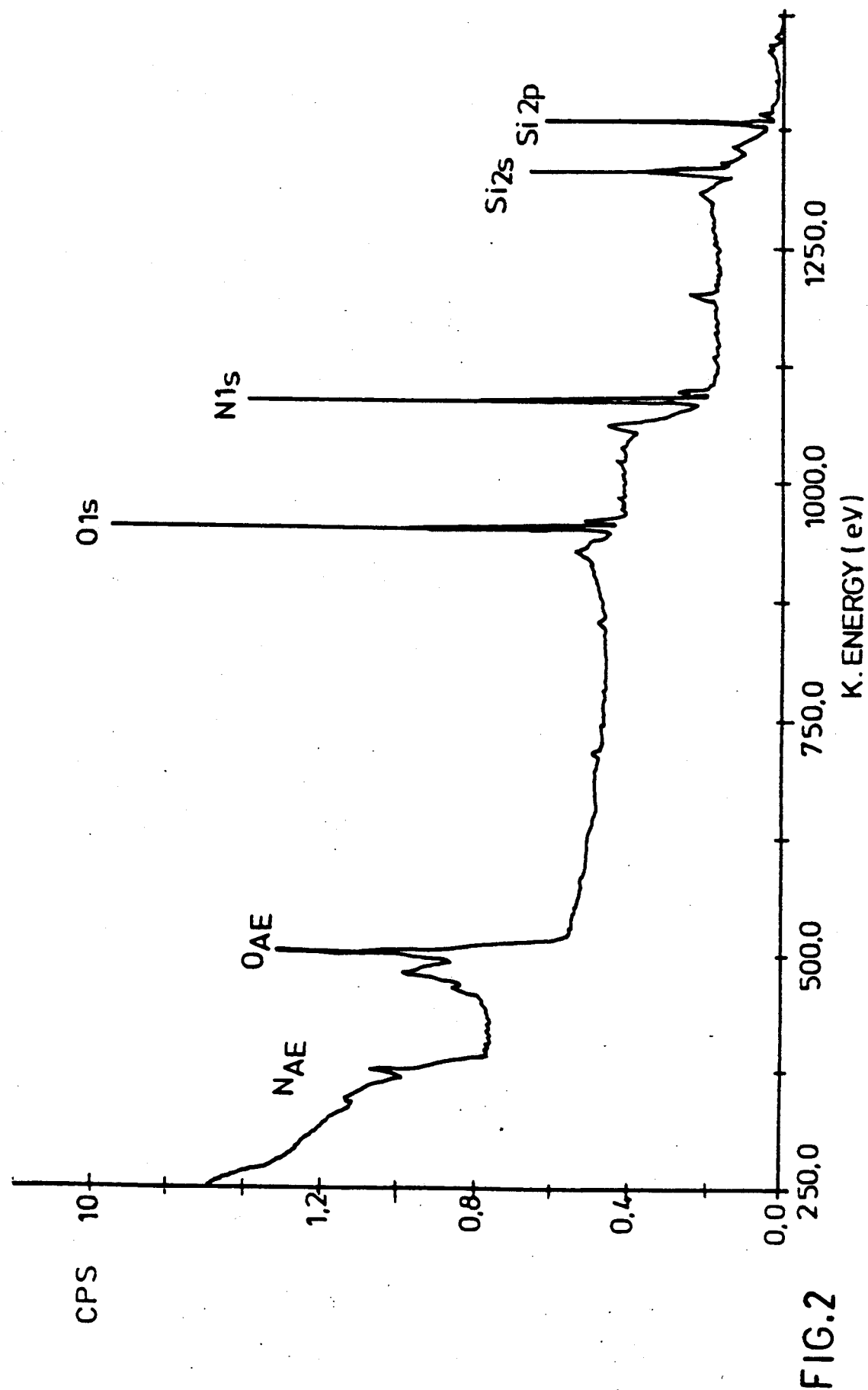

FIG. 2 shows the ESCA-spectrum (=XPS-spectrum) of the milled sample.

The values given in Table 2 may be determined by the method of Peuckert and Greil:

TABLE 2

| | | Calculation of the percentage proportion of surface oxygen | | | | |
|---|---|---|---|---|---|---|
| $I_O/I_N$ | $d_{XPS}$ [nm] | BET [m²/g] | $D_s$ [μm] | $C_O$ [% by wt.] | $d_s$ [nm] | $d_{XPS}/d_s$ [%] |
| 0.537 | 0.528 | 13.3 | 0.142 | 1.2 | 0.746 | 71 |

According to these figures, the percentage proportion of surface oxygen, based on the total oxygen content, is 71%.

What is claimed is:

1. $Si_3N_4$ powders having a total oxygen content of less than 1.8% by weight with the proportion of surface oxygen content of more than 65% of the total oxygen content, and having a fluorine content of less than 35 ppm.

2. $Si_3N_4$ powders according to claim 1 wherein the fluorine content on the surface of the $Si_3N_4$ powder is less than 0.1 atom percent.

3. $Si_3N_4$ powders as claimed in claim 1, prepared by annealing $Si_3N_4$ powder having a total oxygen content of less than or equal to 0.4% by weight in an oxygen-containing atmosphere at temperatures of 700 degrees C. to 1200 degrees C. for 15 to 90 minutes.

4. $Si_3N_4$ powders as claimed in claim 1, prepared by grinding $Si_3N_4$ powder having a total oxygen content of less than or equal to 0.4% by weight in water, alcohol or aqueous alcohol for 15 to 120 minutes.

* * * * *